June 27, 1939.   J. TJAARDA   2,164,097
AUTOMOBILE BODY
Filed Dec. 7, 1936   5 Sheets-Sheet 5

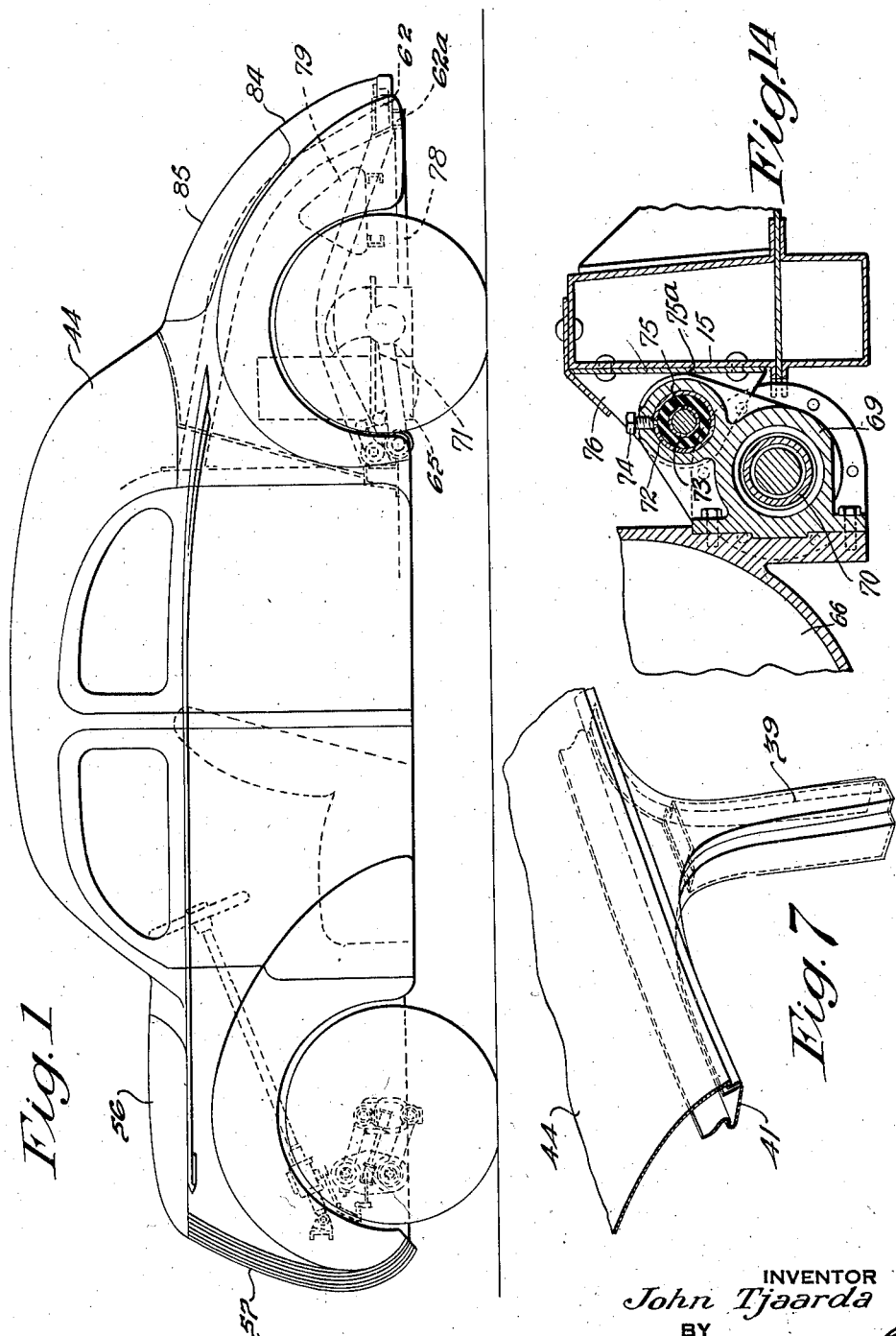

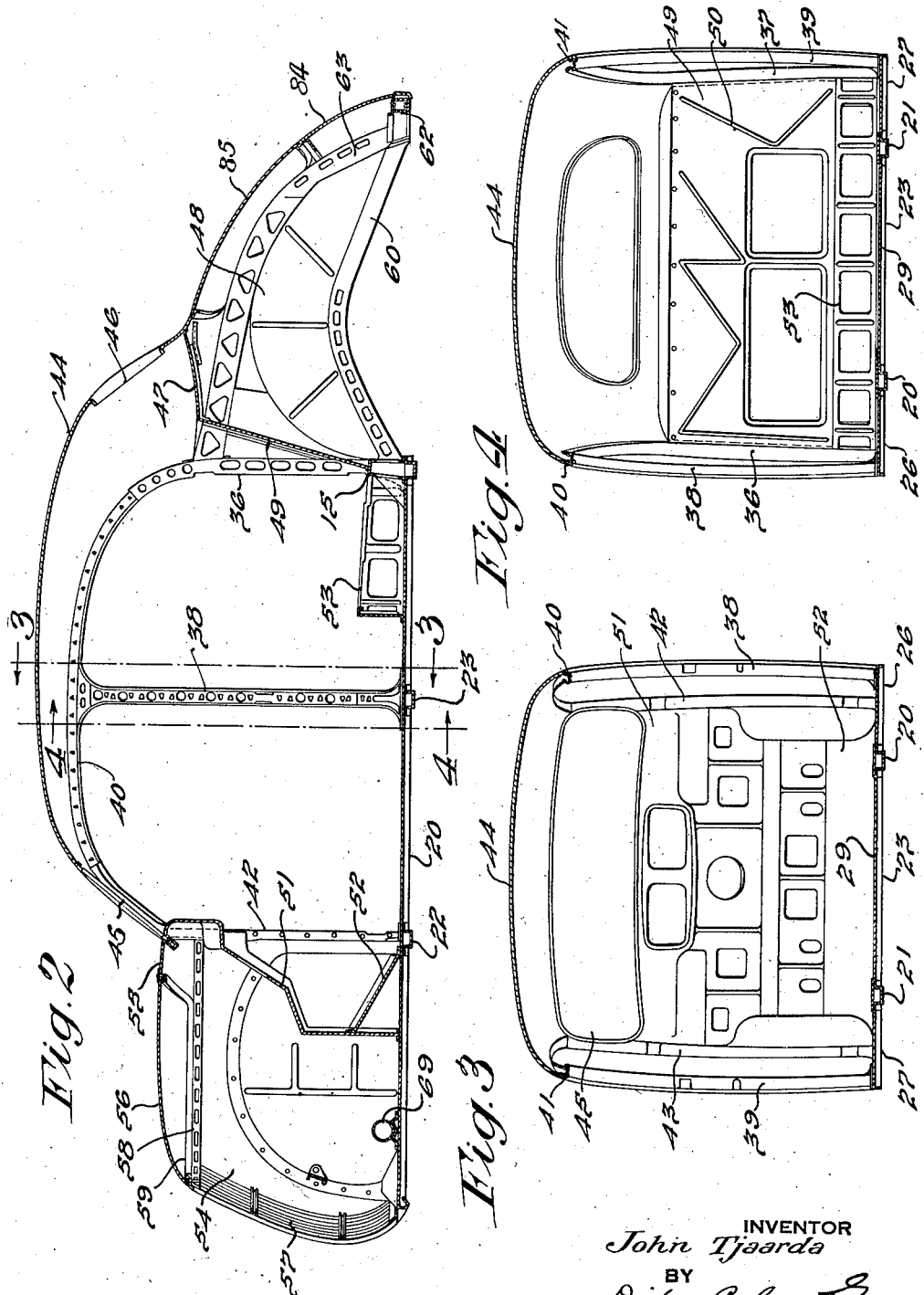

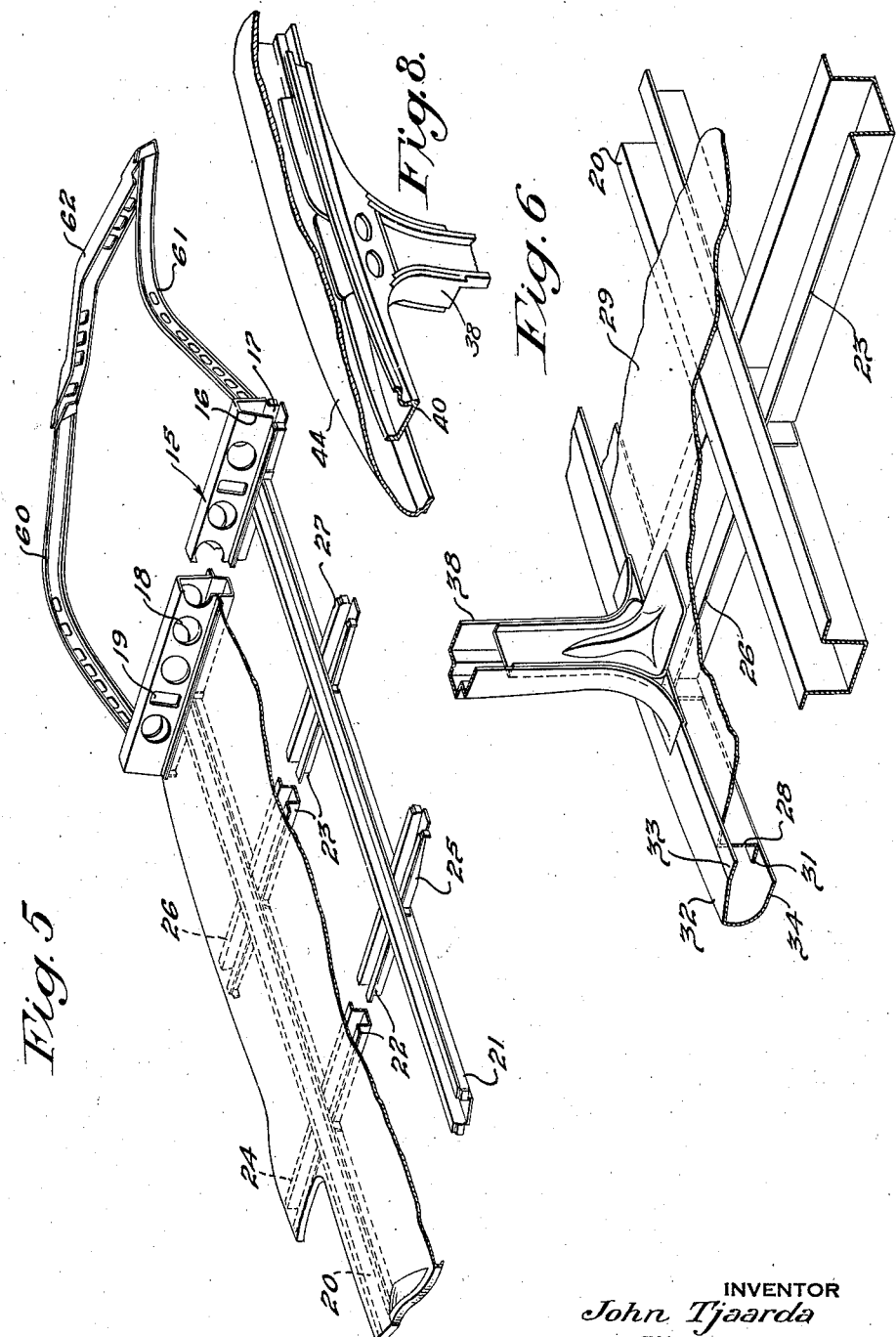

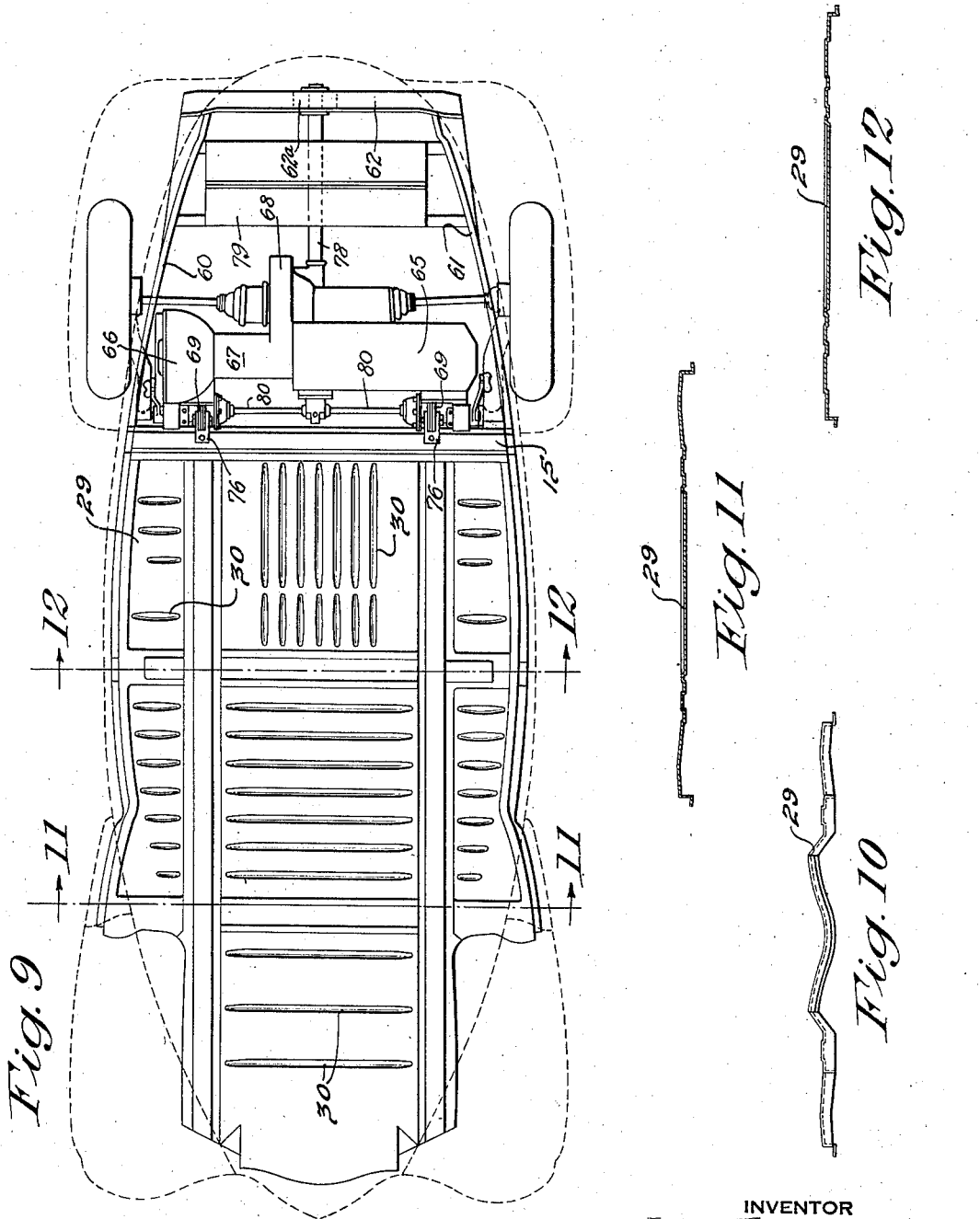

INVENTOR.
John Tjaarda
BY
Dike, Calver & Gray
ATTORNEY.

Patented June 27, 1939

2,164,097

UNITED STATES PATENT OFFICE 2,164,097

AUTOMOBILE BODY

John Tjaarda, Birmingham, Mich., assignor to Briggs Manufacturing Company, Detroit, Mich., a corporation of Michigan Application December 7, 1936, Serial No. 114,613

8 Claims. (Cl. 180—1)

This invention relates to motor vehicle bodies and more particularly to bodies of the unitary body and frame type. This application is a continuation in part of my co-pending application Serial No. 72,721, filed April 4, 1936.

It has been appreciated that many advantages are attainable if the body and the frame of a motor vehicle are constructed as a unitary structure, and the separate power plant and running gear carrying frame is eliminated. Accordingly, numerous unitary structures have been provided in which load stresses are transmitted and distributed throughout the entire body structure, whereby the upper body structure forms with the base or chassis frame members a unitary load carcass. While enabling certain advantages to be secured not found in vehicles having separate body and chassis, the above structures have proved to possess certain disadvantages preventing universal adoption of said unitary body and frame structures. One of the most serious of said disadvantages was the necessity of constructing such bodies much heavier and stronger than it has been heretofore customary with motor vehicle bodies. Very heavy and rigid skeletons or carcasses were found to be necessary in order to produce a unitary body and chassis structure capable of withstanding without objectionable distortions the loads imposed on the structures in operation conditions. Attempts to make the structures lighter necessitated multiplying the number of reenforcing carcass members and joints to an impracticable number, thus unreasonably complicating the body structure, increasing the cost of manufacture, and causing objectionable noises to develop in places of numerous junctures and joints.

One of the objects of the present invention is to provide a unitary body and chassis structure in which the above mentioned difficulties are eliminated without sacrificing the advantages inherent in such structures.

Another object of the invention is to provide a motor vehicle body of the unitary frame and body type in which the number of reenforcing frame members is reduced to a minimum, part of the load stresses being carried by the shell of the body as well as by the partitions having utilitarian functions, such as by the dashboard, and by the partition separating passenger and engine compartments of the vehicle.

A further object of the present invention is to provide a novel and improved body for a motor vehicle having a rear mounted power plant, in which body there is provided a rigid frame on which the combined power plant and driving wheels unit is mounted, said frame being secured at the rear of a passenger compartment, the construction of said compartment being made dependent for its strength on the strength of the rigid floor structure, vertical side trusses secured to said floor structure, and a stiff roof sheet connecting said side trusses.

Another object of the invention is to provide a novel and improved motor vehicle body which is adapted to permit such suspension of the combined power plant and driving wheels units that the same may be easily disconnected and removed either for repairs or for substitution by a similar unit, and yet which in use is rigidly attached to the body and transmits the driving and reactive forces to the body structure, as well as supports the weight thereof at such points that a desirable distribution of stresses may be effected with a minimum number of body frame and shell members.

A further object of the invention is to provide a motor vehicle body with means for independent suspension of front wheels, which means are secured to the top surface of the floor structure and are substantially enclosed within the body of the vehicle.

A still further object of the invention is to provide a novel and improved motor vehicle body having means for such suspension of the power plant and wheels that the lower surfaces of the floor structure are substantially free from protruding parts, thereby permitting lowering the floor structure below the centers of the wheels, thus ensuring greater stability of the entire vehicle.

It is an added object of the invention to provide a motor vehicle body of the foregoing character which has a few structural elements, is simple and cheap to manufacture, particularly in large volume and yet which is strong, practical in use, and is of improved appearance.

Other objects of this invention will appear in the following description and appended claims, reference being had to the accompanying drawings forming a part of this specification wherein like reference characters designate corresponding parts in the several views.

Fig. 1 is a side elevation of a motor vehicle having a body constructed in accordance with the present invention, the position of the combined power plant and driving wheels unit being indicated by dotted lines.

Fig. 2 is a longitudinal vertical sectional view of the body.

Fig. 3 is a transverse vertical sectional view of the body looking toward the front thereof, section being taken on the line 3—3 of Fig. 2.

Fig. 4 is a transverse vertical sectional view of the body looking toward the rear thereof, section being taken on the line 4—4 of Fig. 2.

Fig. 5 is a fragmentary perspective view of the floor structure and rear engine carrying frame, showing the bulkhead to which the same are secured.

Fig. 6 is a fragmentary perspective view showing details of the floor construction, and particularly the method of securing the reenforcing door pillars to the floor structure.

Fig. 7 is a detail view showing the method of securing the door pillars to the roof panel, as the joint would appear to an observer looking from the outside of the body.

Fig. 8 shows a similar joint as the same would appear to an observer looking from the inside of the body.

Fig. 9 is a plan view of the floor structure, the bulkhead, and the power plant supporting frame, together with the principal parts of the power plant and rear wheels particularly indicating the connecting means between these elements and the supporting frame, contour of the body and of the fenders being shown in dotted lines.

Fig. 10 is a front view of the floor pan.

Fig. 11 is a sectional view of the floor pan, section being taken on the line 11—11 of Fig. 9.

Fig. 12 is another sectional view of the floor pan, section being taken on the line 12—12 of Fig. 9.

Fig. 14 is a vertical sectional view taken along the line 14—14 of Fig. 13 in the direction of the arrows.

Figure 13:
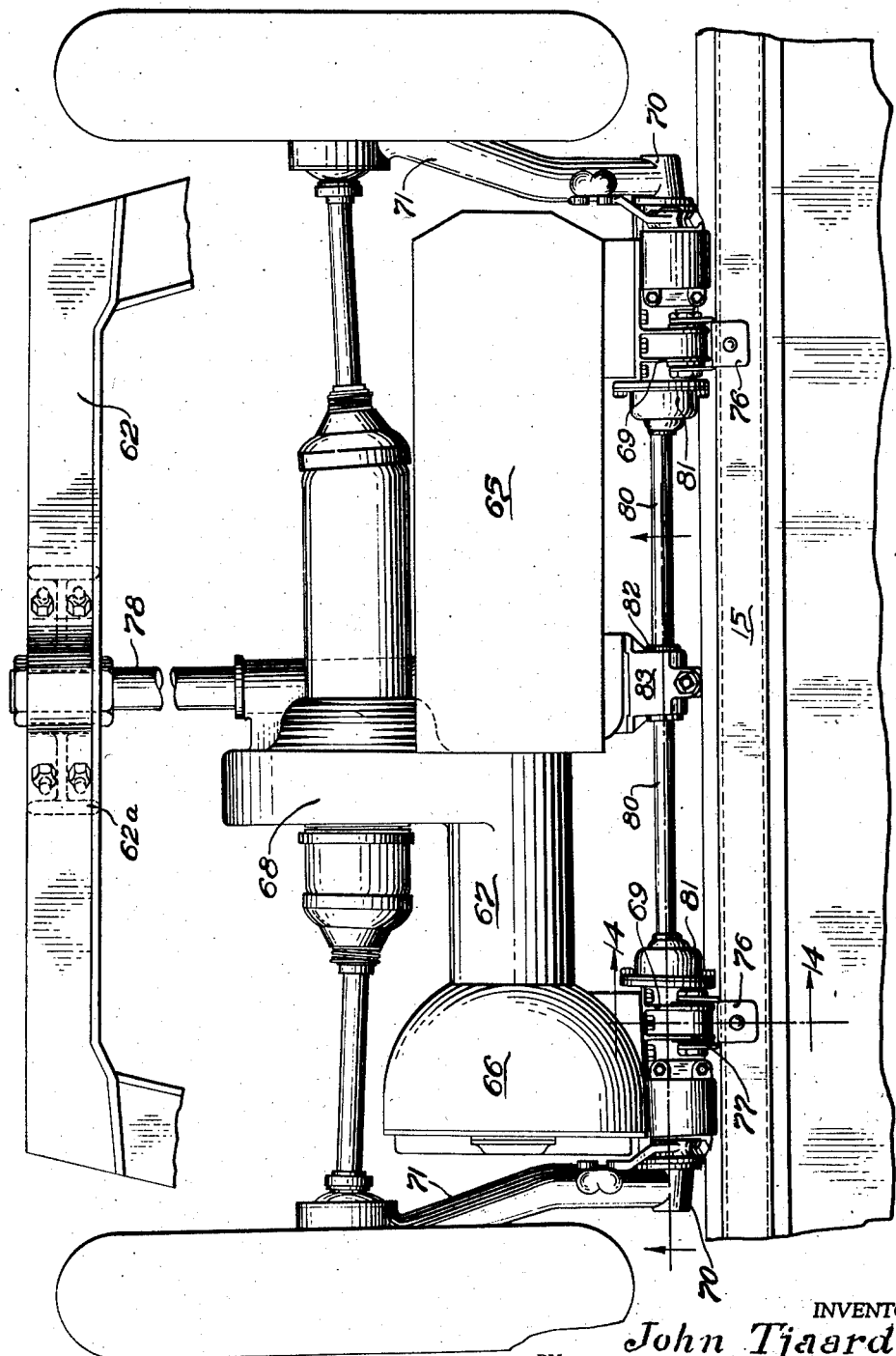
Fig. 13 is a fragmentary plan view on an enlarged scale of the engine, the drive and the suspension with adjacent portions of the body.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle of the unitary chassis and body type embodying the present invention. In the present preferred form of the invention the body structure is adapted for a partially streamline motor vehicle with the unitary engine and driving wheels assembly mounted at rear thereof. However, it is to be understood that the invention may be adapted with suitable changes in design to other types of automobile vehicles, such for example, as to front driven vehicles with front mounted engines.

Referring to the drawings, the body constructed in accordance with the present invention comprises, first, a rigid floor structure capable of carrying considerable loads. A passenger compartment is built upon said floor structure by attaching thereto vertical door pillars and bracing or securing said pillars by a stiff roof panel. At the lower rear portion of the passenger compartment there is secured a transverse hollow bulkhead of considerable stiffness to which bulkhead the floor structure and the rear door pillars are securely attached. To said bulkhead and to the rear pillar attached thereto is secured a rigid power plant supporting frame or cage composed of strong frame members. Thus, in a sense, the body structure is built upon said bulkhead and all the stresses resulting from the operation of the vehicle or its power plant are transmitted to and consolidated in said bulkhead. Now, since the power plant and the driving wheels, as well as the mechanism interposed between them, constitute a unitary structure and the same is mounted in said cage, the stresses and strains resulting from the operation of the power plant, such as forward thrust driving the vehicle, torque and brake reactions, and the like, are confined to said rigid rear frame or cage and are not transmitted to the entire vehicle body. This arrangement permits a very light construction of the remaining body portions, eliminating numerous reenforcing frame members which have heretofore been indispensable in unitary body and frame structures, and enabling the use of body panels, such as the roof sheet, for carrying part of the load stresses as well as for forming the outside surfaces of the body. In other words, my invention permits constructing a vehicle body of such a character that the same possesses all the advantages of the unitary body and frame structure, eliminating at the same time most of the disadvantages which have heretofore been considered as inherent in structures of the above character.

Referring more particularly to Figs. 2 and 5, the numeral 15 indicates generally the bulkhead made of two flanged channel pieces 16 and 17 welded or otherwise secured together at their flanges. The side walls of the channels are cut out as shown at 18 and 19 in order to decrease weight without substantially weakening the bulkhead. The floor structure comprises longitudinal flanged channels 20 and 21 attached by their extremities to the lower channel 17 of the bulkhead 15 and extending forwardly thereof. The channels 20 and 21 are braced in transverse direction by cross channels 22 and 23, similar in cross section to the lower channel 17 of the bulkhead 15. End transverse channels 24, 25, 26 and 27 are affixed to the opposite sides of the members 20 and 21 and appear as continuations of cross channels 22 and 23. The foregoing parts are preferably secured together by welding.

The outward extremities of the channels 24, 25 26 and 27 are adapted to be secured to the depending flanges 28 of the floor sheet or pan 29, shown in Fig. 6. The floor pan 29 extends forwardly of the bulkhead 15 through the entire remaining length of the body and is reenforced by a number of suitably disposed ribs or beads 30, as can be seen in Fig. 9. The depending flanges 28 of the floor pan 29 are provided with outwardly extending flanges 31 to which is secured a rounded side channel 32, the lower flange 34 whereof is secured by welding to the flange 31 of the floor sheet, while its upper flange 33 overlies the edge of the top surface of the floor sheet and is secured thereto by welding, see Fig. 6. A similar rounded side channel member is provided along the other side of the floor structure.

Two vertical rear pillars 36 and 37 are secured by welding to the extremities of the bulkhead 15, while two vertical intermediate door pillars 38 and 39 are welded to the upper flanges of the side members 32 and 35 and to the floor sheet 29 at the extremities of the end channels 26 and 27, as shown in Fig. 6. The upper ends of the pillars 36 and 37 are curved forwardly to form continuations of side roof rails 40 and 41 which extend forwardly and are secured to the front vertical members 42 and 43 which members are secured by their lower ends to the floor structure above the outward extremities of the cross channel extensions 24 and 25. Intermediate their extremities the roof rails 40 and 41 are secured by welding to the upper ends of the front door pillars 38 and 39.

Rigidity and strength of the body structure in transverse direction is enhanced by the panels forming the shell of the body or by the sheets serving as partitions in the interior thereof. Such panels and sheets are exemplified, first, by the pressed metal roof panel 44 which covers the entire top of the passenger compartment and is secured in any suitable manner to the roof rails 40 and 41. The front portion of said roof panel terminates at the windshield 45, while its depending rear portion is provided with an opening 46 for the rear window, its rear edge being adapted to be joined by welding with the sheet 47 covering the engine compartment 48. The sheet 47 is extended to form a partition 49 separating the passenger compartment from the engine compartment and is secured at its lower edges to the bulkhead 15, its rigidity being increased by provision of stiffening beads 50. At the front of the passenger compartment there is provided a pressed metal dash 51 which in addition to its conventional functions also serves as a reenforcing structural cross member of the body. The inclined foot board 52 also contributes to the rigidity of the body structure, besides presenting a comfortable foot rest for the occupants of the front seat of the vehicle. The rear seat pan 53 secured to the bulkhead 15 and to the floor pan also adds to the strength of the body structure. Suitable hinged doors are provided in the openings defined by the pillars, floor structure, and the roof rails.

A luggage and spare tire compartment 54 is located in the present embodiment at the front of the passenger compartment and it is formed by continuations of the side walls of the body compartment, dash 51, floor sheet 29 and the top sheet 55, the latter having an upwardly opening lid 56. Any desired shape may be imparted to the baggage compartment. I prefer to make the same in a form resembling the engine compartment of conventional motor vehicles with front mounted engines. A grille 57 arranged at front of the compartment serves for ornamental purposes simulating the conventional radiator grilles. Horizontally extending members 58 secured at their extremities to the grille 57 and the front vertical members 42 and 43 carry a lid supporting frame 59 to which the lid is hinged.

The engine and wheel supporting frame comprises longitudinal framing members 60 and 61 secured to the bulkhead 15 and extending rearwardly therefrom, and a rear transverse framing member 62 connecting the rearward extremities of said members 60 and 61. Curved brace members 63, see Fig. 2, secured by their respective extremities to the transverse member 62 and the upper portions of the rear pillars 36 and 37 respectively, are provided for resisting the vertically directed forces acting upon said transverse member 62. Thus a strong and sufficiently rigid engine and driving wheels supporting frame is provided on which the unitary engine and wheel assembly may be mounted in any suitable way. A preferred way of mounting said unitary assembly is shown in Fig. 1, and is described in detail in my above identified copending application.

In the arrangement mentioned the crankcase of the engine 65, the housing of the clutch 66 and the transmission 67 are rigid with each other and with the housing of the final drive and differential 68 lying directly behind the engine 65 and the transmission 67. The engine, the transmission and the clutch are arranged in line transversely of the vehicle, their sides facing the front and the rear of the car. On the side facing the front are securely bolted two large brackets 69 spaced far apart, one on the housing of the clutch 66 and one on the crank case of the engine 65 near the end away from the clutch 66. Besides carrying pivots 70 for the longitudinal swinging arms 71 which carry the rear wheels, the brackets 69 serve as part of the means for mounting the engine and suspension assembly in the body.

Each bracket 69 has a hole into which fits a metal sleeve 72 containing a resilient rubber bushing 73, the sleeve being retained by a set-screw 74 in the bracket 69, see Fig. 14. The bushing 73 surrounds an inner metal sleeve 75, which inner sleeve fits between the two legs or side flanges of a U-shaped bracket 76 suitably fixed as by riveting to the bulkhead 15, and is secured thereto by a bolt which passes through the sleeve 75 and the legs of the bracket 76 and clamps them together. Rubber washers 77 (Fig. 13) are interposed between the side flanges of bracket 76 and bracket 69 which fits between said flanges. As a result of the foregoing there is no continuous metal to metal path between the engine and suspension and the body at either of the brackets 76.

The third point of support for the engine and wheel suspension assembly is provided by a tube 78 rigidly secured to the housing of the differential and extending back on the center line of the vehicle under a fuel tank 79 to the rear transverse member 62 which arches over it. The end of said tube 78 is connected to a bracket 62a secured to the transverse member 62, a rubber bushing being provided in said connection to avoid any metal to metal path from the engine and wheel suspension assembly to the body at this point.

The driving wheels are carried by the swinging arms 71 extending longitudinally of the vehicle and provided at their front ends with integral tubular spindles 70 extending transversely of the vehicle through the above mentioned brackets 69 secured to the engine and wheel suspension assembly. Each spindle 70 is separated from its retaining bracket 69 by a pair of resilient rubber bushings, the spindle 70 being so held within and against the bushings by an appropriate nut, bolt and washer assembly.

The swinging of each wheel arm 71 is resiliently restrained by a cylindrical torsion bar 80 lying on the axis of the wheel arm spindles 70 and having its opposite ends respectively secured to the rotatable spindle 70 and to the fixed crank case of the engine 65 (Fig. 13). The outer end of each torsion bar 80 is splined into the outer end of one of the spindles 70, the bar 80 extending through the spindle 70 to the center line of the car and abutting the inner end of the torsion bar on the other side of the car. The point where the torsion bar 80 emerges from the hollow spindle 70 is closed by a small bell-shaped housing 81 bolted to the side of the bracket 69.

The inner ends of the two bars 80 are splined into a short sleeve 82 which is carried by a bracket 83 bolted to the crank case of the engine 65.

The above mentioned three points of engine support are in fact supports for the combined engine and driving wheels unit, and therefore they receive all forces and reactions resulting from the operation of the engine and the driving wheels. Numerous advantages are inherent in the above arrangement. Since the distance between the points of application of said forces are very small and the cage is rigid, deflection of the structural members is very small and it is substantially confined to the rigid rear frame cage and is not transmitted to the rest of the body structure. The forward thrust of the driving wheels is received by the bulkhead 15 and is transmitted to the rigid floor structure which is capable of withstanding such loads without appreciable deflection because of the negligible bending moment produced by said forward thrust forces.

The horizontal components of the forces applied to the transverse rear member 62 are transmitted by the members 60 and 61 to the bulkhead 15, while the vertical components of said forces are transmitted by the members 63 to the vertical pillars 36 and 37. It is important to note that the bending moments produced by the action of said members 63 on the pillars 36 and 37 around the lower ends thereof can be balanced by the application of very small resisting forces at the top of said pillars, and therefore, the roof sheet 44 and the front pillars 38 and 39 are capable of exerting such resisting forces without any substantial deformation. Thus, forces of high magnitudes resulting from application of forces on said transverse rear member 62 are still localized in the rear cage and in the bulkhead 15.

The front wheels are also individually sprung and are carried by the transverse preferably tubular member 69 secured to the floor structure at the front of the vehicle. Thus the operative forces transmitted to the vehicle body by the front wheels are also received by the floor structure and are not transmitted vertically to other structural elements of the body. Thus premature destruction of the body as well as the development of objectionable noises therein are prevented.

A suitably shaped rear panel 84 is provided to cover the engine compartment and the same is provided with a hinged lid 85 permitting access to the engine. Rear and front fenders are provided at the front and driving wheels, respectively, as indicated in Fig. 9. I prefer to make the front fenders terminating adjacent the front edges of the doors, said doors being contoured to form continuations of the contour of said fenders (see Fig. 1).

Thus considered from one of its broader aspects my invention contemplates providing a novel unitary body and chassis motor vehicle in which the unitary engine and driving wheels assembly is mounted on a special rigid frame, the stresses and strains resulting from the operation of the engine and driving wheels being carried by the rigid floor structure, whereby numerous reenforcing members heretofore indispensable in passenger compartments of the unitary chassis and body structure are eliminated and contour forming panels may be utilized to carry part of the stresses induced in the passenger compartment structure.

I claim:

1. In a motor vehicle of the unitary body and chassis type having a passenger compartment, a transverse bulkhead, a rigid frame secured to said bulkhead, a combined power plant and driving wheels unit secured to said bulkhead and said frame, a reenforced floor structure secured to said bulkhead, said floor structure adapted to resist the driving thrust, a plurality of substantially vertical members secured by their lower extremities to the floor structure substantially at the longitudinal edges thereof, and a pressed metal roof sheet forming the sole connecting means transversely between the top extremities of said vertical members.

2. A unitary body and chassis structure comprising a transversely arranged bulkhead; a rigid floor structure secured to said bulkhead and extending forwardly therefrom; two substantially vertical rear door pillars secured by their lower extremities to the extremities of said bulkhead, their upper portions being curved forwardly and carried toward the front of the body; two intermediate door pillars secured to said floor structure forwardly of said rear pillars and secured to the curved portions thereof; two front door pillars secured to the floor structure forwardly of said intermediate pillars, the ends of said front pillars being connected with the respective ends of said forwardly curved rear pillars; a roof panel covering the top of the compartment defined by said pillars and forming the sole transverse connecting means between the upper extremities of said intermediate pillars.

3. In a motor vehicle, a transverse bulkhead at the rear thereof, a rigid frame secured to said bulkhead and extending to the rear thereof comprising longitudinal side members and a cross member connecting the rear ends of the side members, a transversely extending power plant supported at two transversely spaced points upon said bulkhead and disposed in rear thereof, a longitudinal member connected to said cross member centrally thereof and providing a third point of support for the power plant, and a pressed metal reinforced floor structure secured to said bulkhead and extending forwardly thereof and adapted to support the non-driving wheels, said bulkhead being adapted to receive the major portion of the forward driving force produced by said driving wheels and to transmit the same forwardly to said floor structure.

4. In a motor vehicle, a transverse bulkhead at the rear thereof, a rigid frame secured to said bulkhead and extending to the rear thereof comprising longitudinal side members and a cross member connecting the rear ends of the side members, a transversely extending power plant supported at two transversely spaced points upon said bulkhead and disposed in rear thereof, a longitudinal member connected to said cross member centrally thereof and providing a third point of support for the power plant, a pressed metal reinforced floor structure secured to said bulkhead and extending forwardly thereof and adapted to support the non-driving wheels, said bulkhead being adapted to receive the major portion of the forward driving force produced by said driving wheels and to transmit the same forwardly to said floor structure, and independently sprung driving wheels mounted upon said bulkhead in common with said power plant at said two transversely spaced points.

5. In a motor vehicle, a transverse bulkhead at the rear thereof, driving wheels connected to said bulkhead to transmit forward driving force thereto, a rigid frame secured to said bulkhead and extending to the rear thereof comprising longitudinal side members and a cross member connecting the rear ends of the side members, a transversely extending power plant supported at two transversely spaced points upon said bulkhead and disposed in rear thereof, a longitudinal member connected to said cross member centrally thereof and providing a third point of support for the power plant, and a pressed metal reinforced floor structure secured to said bulkhead and extending forwardly thereof and adapted to support the non-driving wheels, said bulkhead being adapted to receive the major portion of the forward driving force produced by said driving wheels and to transmit the same forwardly to said floor structure.

6. In a motor vehicle, a transverse bulkhead at the rear thereof, a rigid frame secured to said bulkhead and extending to the rear thereof comprising longitudinal side members and a cross member connecting the rear ends of the side members, a transversely extending power plant supported at two transversely spaced points upon said bulkhead and disposed in rear thereof, a longitudinal member connected to said cross member centrally thereof and providing a third point of support for the power plant, a pressed metal reinforced floor structure secured to said bulkhead and extending forwardly thereof and adapted to support the non-driving wheels, a pair of rear driving wheels having swinging wheel carrying arms, a common means for mounting said power plant and arms to the bulkhead, said bulkhead being adapted to receive the forward driving force produced by said driving wheels and transmit the same forwardly to said floor structure.

7. A motor vehicle according to claim 6 in which said means comprises transversely spaced brackets secured to the bulkhead and providing two spaced points of support for the power plant.

8. A motor vehicle according to claim 6 in which said bulkhead comprises a hollow box-like unitary member and in which said means provides two spaced points of support for the power plant.

JOHN TJAARDA.